United States Patent [19]

Vetter et al.

[11] Patent Number: 4,770,836
[45] Date of Patent: Sep. 13, 1988

[54] METHOD FOR PRODUCING COMPONENTS WITH ACCURATE SURFACES

[75] Inventors: Jochen Vetter, Karlsfeld; Walter Klinger, Dachau, both of Fed. Rep. of Germany

[73] Assignee: MAN Technologie GmbH, Munich, Fed. Rep. of Germany

[21] Appl. No.: 872,088

[22] Filed: Jun. 6, 1986

[30] Foreign Application Priority Data

Jun. 27, 1985 [DE] Fed. Rep. of Germany ....... 3522920
Apr. 26, 1986 [DE] Fed. Rep. of Germany ....... 3614191

[51] Int. Cl.⁴ ..................... B29C 39/10; B29C 39/12
[52] U.S. Cl. ..................................... 264/259; 264/1.7; 264/1.9; 264/261; 264/269
[58] Field of Search ............... 264/1.7, 1.9, 261, 262, 264/267, 268, 259, 269

[56] References Cited

U.S. PATENT DOCUMENTS

| | | | |
|---|---|---|---|
| 2,020,178 | 11/1935 | Haas | 264/261 |
| 2,091,615 | 8/1937 | Rohm et al. | 264/261 |
| 3,026,575 | 3/1962 | Lusher et al. | 264/261 |
| 3,029,730 | 4/1962 | Parrish et al. | 264/261 |
| 4,246,222 | 1/1981 | Monthony | 264/261 |
| 4,615,847 | 10/1986 | Howden | 264/1.7 |

FOREIGN PATENT DOCUMENTS

| | | | |
|---|---|---|---|
| 83427 | 5/1982 | Japan | 264/259 |
| 2025838 | 1/1980 | United Kingdom | 264/1.9 |

Primary Examiner—James Lowe
Attorney, Agent, or Firm—Scully, Scott, Murphy & Presser

[57] ABSTRACT

In the case of a method and an apparatus for producing parts with high quality surfaces using a mold and curing resin, such as epoxy resin, the first step is to place a workpiece blank so that there is minimum gap between it and the mold. Then resin is introduced into the gap in a non-separating flow utilizing capillary forces in the gap. The epoxy resin then cures and the workpiece coated with such epoxy resin is separated from the mold.

10 Claims, 2 Drawing Sheets

METHOD FOR PRODUCING COMPONENTS WITH ACCURATE SURFACES

BACKGROUND OF THE INVENTION

The invention relates to a method and an apparatus for forming high quality surfaces on workpieces by placing the workpiece adjacent to a mold with the desired form of surface so that a gap is formed between the latter and the workpiece and curable resin is introduced into the gap. More specifically, the invention is concerned with the production of parabolic concave antennas.

A large number of different techniques are presently available for producing accurate castings in molds. Furthermore, casting methods have been proposed for filling up flaws in a blank or faulty component by placing it in contact with a mold and introducing any of a range of different casting materials such as a casting resin between the mold and the workpiece. This latter form of the method yields a negative replica of the mold with an accuracy which usually increases with a decrease in the size and unevenness of the gap to be filled between the material and the mold, since the casting materials introduced into it are generally subject to a volume-dependent degree of shrink on solidification. For casting within such small gaps vacuum or pressure methods may frequently be used. A disadvantage of such methods is the deformation of the workpiece occurring owing to the acting forces. Such deformation is unacceptable, more especially in the case of high precision molded components.

Furthermore, there are processes for the production of structures in which metallic or organic foil of various types is bonded to the workpiece. The foil is provided with a hot melt or other adhesive and is pressed on the workpiece mechanically, pneumatically or hydraulically. In such a process the aim is to produce a bonding gap which is as even as possible. The larger the areas to be bonded the greater the risk of gas inclusions. The coating necessarily alters the geometry and dimensions of the component.

SUMMARY OF THE INVENTION.

One aim of the invention is the creation of an improved method and an apparatus for reliably molding components with a high quality surface, using simple means, by introducing the resin into a gap formed between part of said workpiece and a mold.

As part of a further development of the invention, components are to be produced, using simple means, in the form of antenna bowls conforming to a paraboloid of revolution.

In order to attain these or other objects appearing in the course of the ensuing specification and claims, a method of forming a high quality surface on a workpiece is characterized by the steps of placing said workpiece, with an inaccurate surface thereon, adjacent to a mold with a high quality surface corresponding to said eventual high quality workpiece surface to be produced, so as to leave a minimum gap therebetween, introducing a curable resin into said gap, said resin being allowed to flow in a non-separating manner and substantially solely under the action of capillary forces, causing said resin to cure and removing said workpiece form said mold with said resin thereon as a coating.

In the new method the resin filling the gap is not introduced by pressure or vacuum but only by exploiting capillary forces. The width of the minimum gap is so selected in this respect that a capillary action is able to take effect. The gap width is a few tenths of a millimeter. The resin used for forming the high quality surface may be any curing resin with a wetting action. It is to be employed without solvents in order to prevent the formation of bubbles. If required a substance may be added which lowers the viscosity so that the resin flows more readily.

The resin is thus supplied in a simple manner by means of only one flexible pipe or the like, care only having to be taken to see that there is no flow separation in order to avoid the inclusion of air bubbles.

In order to form the minimum gap shims are placed on the workpiece or on the mold, that is to say on the part which is lowermost.

On filling the gap with the resin the shims are removed so that it is not possible for the resin to come into contact with them and there is a continuous minimum gap over the full surface of the said workpiece to be produced and between it and the mold so that such gap may be filled with resin utilizing capillary forces in a non-separating flow.

After the upper part, i.e. the mold or the workpiece is fully supported by the resin supplied all the remaining shims are removed more or less simultaneously and if necessary the two parts are pressed together in order to reduce the width of the gap. This may be done by weighting or using mechanical means, which press the two parts together.

It is best for the resin to be introduced at the lowest point of the gap. This ensures that the resin simultaneously wets the two adjacent surfaces as it completely fills up the gap without leaving any air bubbles in it.

In the case of the production of a three-dimensionally curved concave component with a large surface area, as for example of about 1 square meter of an antenna in the form of a paraboloid of revolution, the invention ensures the production of an optimum negative replica of the mold starting with a blank or workpiece which has manufacture-specific flaws. It is placed under the convex mold and the gap therebetween is filled from below or from the side with resin.

A particularly advantageous form of the method is characterized in that before placing the workpiece against the mold a foil of organic material, paper, metal or a metal-organic material composite ("coated foil") is placed against the mold, the workpiece is then arranged in relation to the mold so that there is a gap and the resin is introduced into the gap between the foil and the workpiece. In such a case it is for instance possible for vacuum or mechanical means to be utilized to apply the foil to the mold, —or on the mold if the mold is under the workpiece, and to form the lower part. After the filling of the gap exclusively by capillary forces acting therein, the front or upper side of the foil will form a negative replica of the mold or in other words the configuration of a blank with irregularities will be corrected in a simple operation.

The invention will now be described in detail in what follows with reference to the accompanying drawings.

DESCRIPTION OF THE PREFERRED EMBODIMENT

Figure 1:
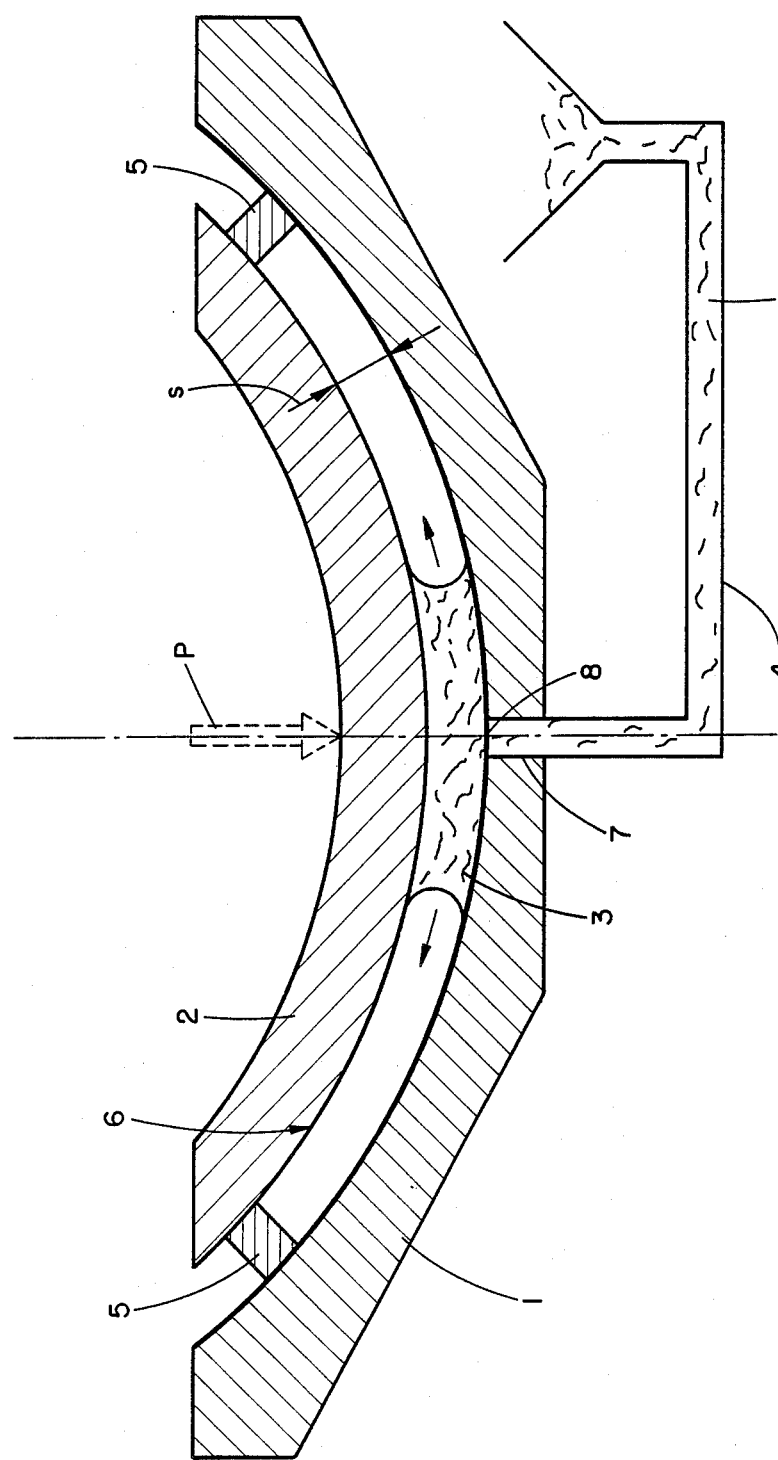
FIG. 1 shows a first working example of the invention.

FIG. 1 shows diagrammatically an apparatus with a lower workpiece 1 for the manufacture of an antenna paraboloid of revolution. This antenna is to be produced with an accurate concave paraboloid surface 6.

The apparatus comprises a mold 2 with a lower and accurate convex paraboloidic surface for molding the surface 6 of the paraboloid, and a resin supply duct 4.

The workpiece 1 is firstly positioned at a distance s of approximately 0.3 mm under the mold 2 using shims 5 between it and the workpiece. The duct 4 is partly in the form of a hole 7 in the workpiece, such hole opening at the lowest point 8 and center of the paraboloidic area.

Then a curable resin 3 with wetting properties, as for instance a polyester, is supplied via the duct 4 in a non-separating stream. Owing to capillary forces the resin progressively fills up the gap s. After a certain time which depends on the weight of the mold 2, the latter will float on the resin so that the shims 5 may be removed.

The resin 3 spreading out under the capillary action displaces air from the gap so that no gas bubbles will be formed. Once the resin 3 has filled the gap s in the desired manner, the mold 2 may be weighted, as for instance by an external weight P in order to reduce the thickness of the resin layer. Curing of the resin or plastic then takes place and the mold 2 is removed.

Owing to the small amount of resin 3 there is practically no shrinkage in volume so that the component to be manufactured has a surface which is substantially an accurate negative replica of the lower side of the mold 2.

If the convex surface is to be corrected, the arrangement will be the other way up so that the mold is under the workpiece. Such a case the resin is supplied downwards—again through the workpiece—to the lowermost point of the gap which also corresponds to the center of the surface to be corrected.

Figure 2:
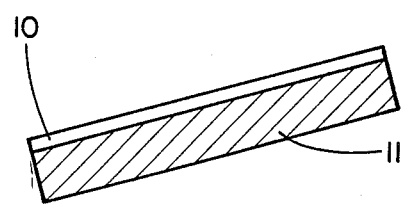
FIGS. 2 through 4 show different stages in the operation of a second working example of the invention.
Figure 3:
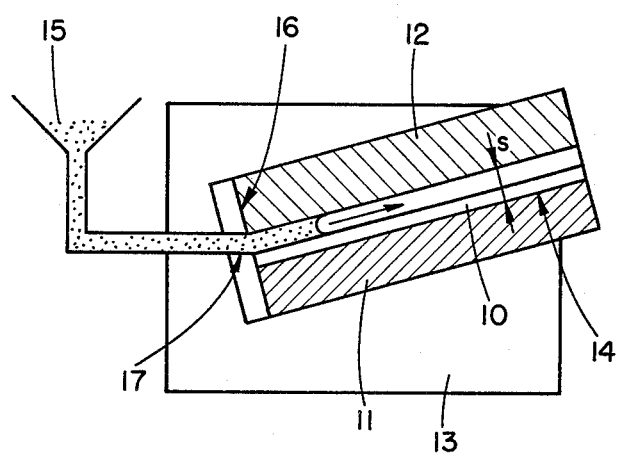

If an additional coating is to be produced on a workpiece 1, a foil 10 (see FIG. 2) made up of an organic material, metal or a composite foil of metal and organic material as a coated foil, is placed on the mold 11. The mold with the foil 10 is then held together with the workpiece 12 (see FIG. 3) in an apparatus 13 in such a way that a capillary gap s is formed between the foil 10 and the workpiece. The surface to be formed is in this case flat and the gap s is therefore held somewhat obliquely in order to cause the filling of the gap s to take place solely by capillary action. The introduction of the resin 15 in this case takes place directly into the gap s, which at the lower side 16 is sealed, such seal extending as far as the inlet 17 for the resin. The seal 16 is funnel-like in cross section so that in all directions there is an ascending direction of motion.

Figure 4:
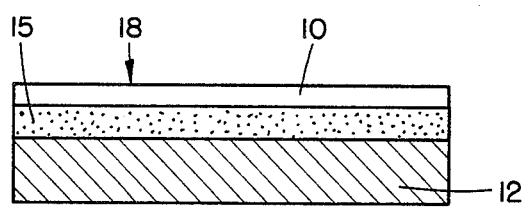

Then, as is the case with the previously described form of the invention, the gap s between the foil 10 and the workpiece fills with epoxy or other resin 3. After removal of the mold the surface 18 of the foil will constitute an accurate negative replica of the mold 11, that is to say, in a single working operation a coating 10 is produced corresponding to the desired surface and at the same time the surface of the workpiece is corrected, see FIG. 4. The foil 10 is applied to the mold 11, for instance by vacuum or by mechanical means.

It will be seen from the above account that in the figures the gap s is not shown to scale and is in fact very much thicker, in relation to the other parts, than is the case in reality. As we have seen it is a question of a very narrow gap s which may be termed a capillary gap, which is only illustrated conventionally, i.e. greatly exaggerated, in the figures.

We claim:

1. A method of forming a high quality surface on a workpiece, comprising the steps of placing said workpiece with an inaccurate surface thereon adjacent to a mold with a high quality surface corresponding to said eventual high quality workpiece surface to be produced, placing a shim means between said workpiece and said mold to define a minimum gap therebetween, introducing a curable resin into said gap at the lowest vertical point of said gap, said resin flowing into said gap in a non-separating manner and substantially solely under the action of capillary forces, removing said shim means after introducing said resin so as to keep the shim means clear of said resin, reducing the width of said gap by weight means relatively pressing said mold and said workpiece towards each other and by mechanical means pressing said mold and said workpiece towards each other, allowing said resin to cure, and removing said workpiece from said mold with said resin thereon as a coating.

2. A method as claimed in claim 1, wherein said resin is introduced into said gap through said workpiece.

3. A method as claimed in claim 1, wherein after removing said shim means, said mold is fully supported by the resin above said workpiece.

4. A method as claimed in claim 1, wherein after removing said shim means, said workpiece is fully supported by the resin above the mold.

5. A method as claimed in claim 1, wherein a foil is placed on the mold and said gap is between a side of said foil remote from said mold and said workpiece, and said resin bonds said foil to said workpiece, said resin being introduced into said gap from below said gap.

6. A method as claimed in claim 5, wherein said foil is a metallic foil.

7. A method as claimed in claim 5, wherein said foil is a composite foil made up of metal with an organic coating thereon.

8. A method as claimed in claim 5, wherein said foil is applied to said mold by vacuum.

9. A method as claimed in claim 5, wherein said foil is applied to said mold by a mechanical means.

10. A method as claimed in claim 1, wherein said resin is an epoxy resin.

* * * * *